Oct. 23, 1962 N. GOURLEY 3,059,489
POWER TRANSMITTING APPARATUS
Filed Oct. 7, 1960 2 Sheets-Sheet 1

INVENTOR
NORMAN GOURLEY

BY *Sughrue, Rothwell, Mion and Zinn*
ATTORNEYS

Oct. 23, 1962  N. GOURLEY  3,059,489
POWER TRANSMITTING APPARATUS
Filed Oct. 7, 1960  2 Sheets-Sheet 2
FIG 8
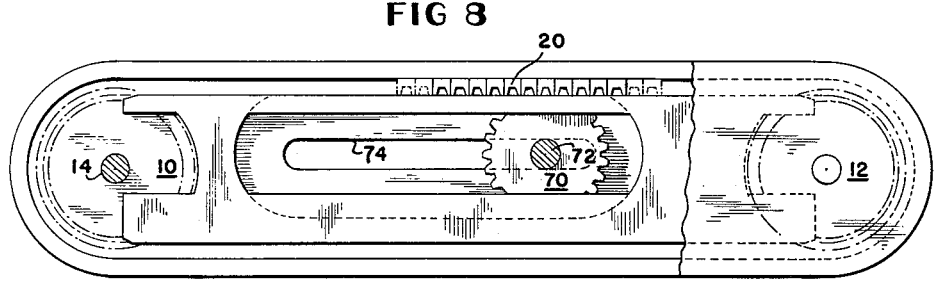
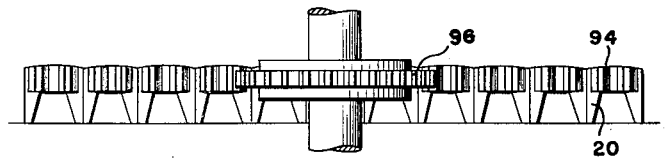
FIG 9
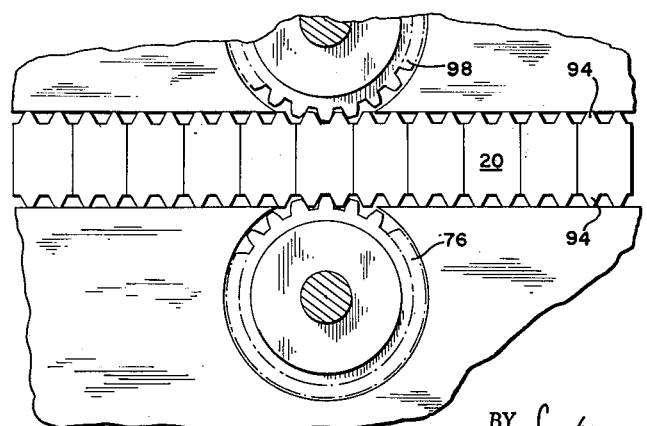
FIG 10
INVENTOR
NORMAN GOURLEY
BY *Sughrue, Rothwell, Mion & Zinn*
ATTORNEYS United States Patent Office 3,059,489
Patented Oct. 23, 1962

3,059,489
POWER TRANSMITTING APPARATUS
Norman Gourley, Box 375, R.F.D. 1, Springfield, Vt.
Filed Oct. 7, 1960, Ser. No. 61,138
5 Claims. (Cl. 74—216.3)

This invention relates to improvements in power transmitting apparatus. More particularly, this invention relates to an improved power transmitting apparatus of the type wherein the power is transmitted by separate circulated elements.

It is a well known expedient in the art to utilize a plurality of separate circulating elements for transmitting motion and power from one place to another. In the most simple forms a pair of parallel shafts carrying gearlike elements circulate a plurality of balls along guide members in abutting relationship. Such devices operate satisfactorily but because of the shape of the separate circulated power transmitting elements the systems possess a number of inherent defects. One of these deficiencies is the balls, when guided from one tooth element to another, exert side forces on the guiding members and cause unnecessary wear thereto. Further, at the bends or turns, as the balls move around the gear teeth, they exert a large radial force on the guides, thus limiting the speed of the system. This, in conjunction with the fact that the balls contact the teeth of the gears at only one spot thereby limiting the force to be transmitted to a certain design level acts to limit the total amount of power which can be transmitted by the system. Furthermore, the balls and gear teeth cannot be manufactured to coact in such a manner so as to produce the extremely high degree of accuracy required in some environments. In addition, because the abutting balls or rollers contact each other only at one spot or along one line, the amount of force per sectional area is relatively great, thereby imparting undue stress, deflection, and wear to the system.

It is to be clearly noted that all of these deficiencies of the prior art result from the inherent structure of the power transmitting elements. Therefore, it is the primary object of this invention to overcome these deficiencies by providing separate power transmitting elements which are so constructed to preclude any of these unwanted and unnecessary efficiency compromising results. This is generally accomplished by providing the individual power transmitting segments in the form of involute gear teeth, i.e. short segments of a rack, for cooperatively meshing with involute gear teeth of cooperating rotating members.

Because the involute tooth form of a gear is one of the best indices of accuracy and because such gear segments can be made to extremely high accuracy, this invention provides means for accurate transmission of linear or rotary motion. Furthermore, the elements constituting rack segments have flat abutting faces therefore they exert no side force on guide channels and in certain arrangements the guide channels can even be dispsensed with. Also, because of the flat abutting sides of the circulating power transmitting elements, the elements can transmit much more force per cross section area. Therefore, the stress and deflection on the elements and on the cooperating gear teeth of the gears is much less.

At the turns or bends around the gears the rack elements exert only a small centrifugal force to the outside of the guide channel because of their cooperation with the teeth of the drive gear. This together with the lower shock and dynamic loads to the teeth because of their close tolerances, allows for higher operating speeds, and further greater forces are obtained because of the rack segment construction. Therefore, more power may be transmitted with the device of this invention.

Because the power transmitting elements are substantially rectangular in abutting sides they can be made with ultra high precision similar to gauge blocks and can be utilized for providing extremely precise positioning. This accuracy combined with lower deflections reduces vibration at high speeds to a minimum.

Due to the inherent advantages of the system as set out above the circulating power transmitting elements may be separate one tooth rack segments and may also be connected by an elastic belt to eliminate much of a guide system. Furthermore, with such an arrangement the power transmitting system may be variable as to distance between a driving and driven gear.

Other objects of the invention will be pointed out in the following description and claims and illustrated in the accompanying drawings, which disclose by way of example, the principle of the invention and the best mode which has been contemplated of applying that principle.

In the drawings:

FIG. 8 is a side elevation view with a portion of the cover member removed, showing the device adapted to provide a variable center distance between driving and driven gears;

FIG. 9 is a side elevation view of the apparatus showing additional gear teeth in the sides of the power transmitting rack elements for further modification of the power transmission; and FIG. 10 is a top plan view of the portion of the apparatus shown in FIG. 9.

Figure 1:
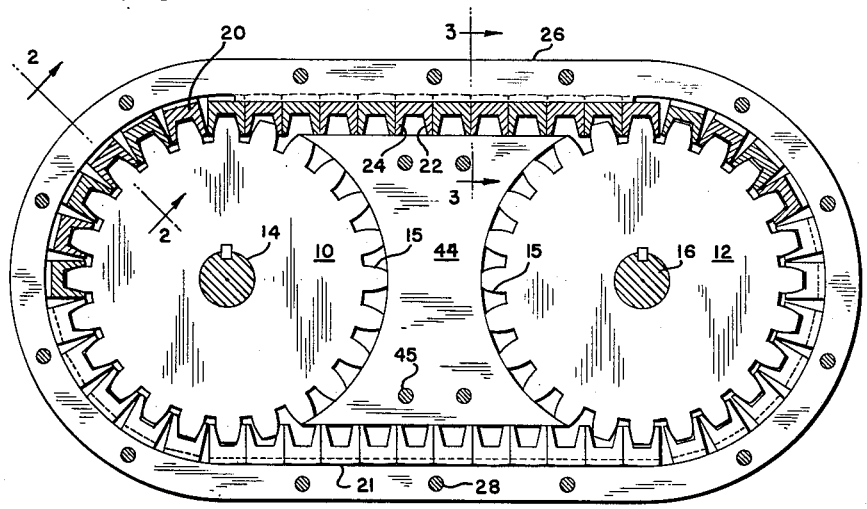
FIG. 1 is a side elevation view partially shown in section for the sake of clarity.

Referring now to the drawings for a detailed description of the invention, FIG. 1 shows a pair of gears 10 and 12 rigidly secured to parallel mounting shafts 14 and 16 so that they are mounted in the same plane. Each of the gears has involute gear teeth 15 around the periphery thereof. One of the gears may be a drive gear and the other gear may be a driven gear. For transmitting power from one gear to another there is provided a plurality of separate power transmitting elements 20, each element shaped as a segment of a rack and having an involute rack tooth form cavity 22 formed therein. The abutting side edges 24 of the elements 20 are flat and abut one another along their entire length. The projection formed at abutting edges 24 of adjacent elements 20 is also an involute of rack tooth form. When a plurality of these elements are positioned side by side in abutting relationship they form in effect a structure similar to a rack as evident from FIG. 1.

Figure 2:
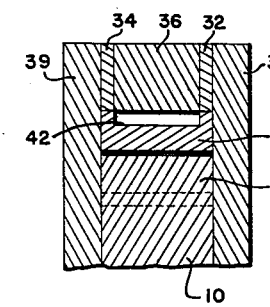
FIG. 2 is an enlarged detailed sectional view taken along line 2—2 of FIG. 1.

The elements 20 are guided and supported by a suitable support guide 26. As shown in FIG. 2, the gear 10 has teeth 15 which cooperate with the tooth cavity in a rack element 20 as the element is circulated around the gear. The guide 26 consists of a pair of wear members 32 and 34 separated by a suitable spacer 36 or it may be made in one piece, and outside cover members 38 and 39 cover the entire assembly which is held together by suitable bolts 28.

Figure 3:
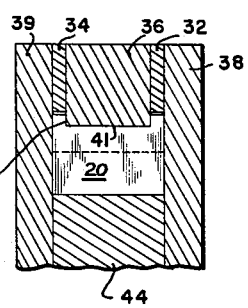
FIG. 3 is an enlarged sectional view taken along line 3—3 of FIG. 1.

As shown in FIG. 3, the guide spacer 36, in the portion of the support 26 where the elements are in full abutting relationship while transmitting power between the two gears, extends downwardly at downward projection 41 for cooperating with a groove 42 in the back side of each element 20. This effectively provides a rigid guide for the abutting elements 20 in that portion of their travel between gears 10 and 12, further an inside support 44 also secured to outside laminations 38 and 39 by bolts 45 is provided for supporting and guiding the opposite side of the elements 20. Thus, wear members 32 and 34, and spacer 36 function collectively as a guide channel for the elements 20 as they are circulated between gears 10 and 12 and inside support 44 assists in supporting the elements when they are not in mesh with the gears.

It is noted that the back edge of each rack segment or element 20 is slightly curved as at 21 in FIG. 1 so that as they go around the curved portion of the guide 26 in mesh with the gear teeth, the back edges of the elements will not conflict with the guide.

Figure 5:
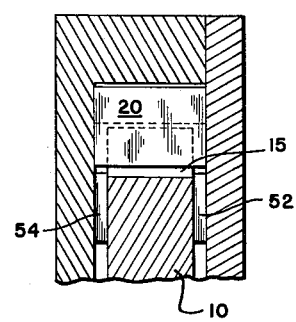
FIG. 5 is an enlarged sectional view taken along line 5—5 of FIG. 4.
Figure 4:
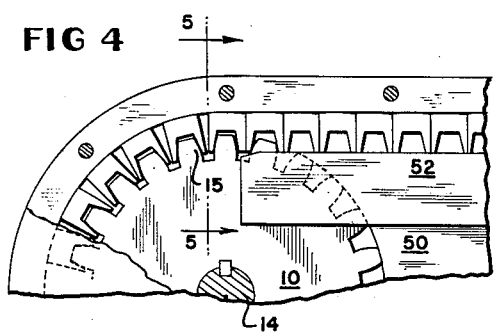
FIG. 4 is a portion of a side elevation view showing a modification including a particular guide system for guiding the power transmitting rack elements.

As shown in FIGS. 4 and 5, when the axes of the gears, such as gear 10 and shaft 14 carrying the gear, are horizontally disposed it is desirable to extend the width of the gear segments beyond the width of the gear teeth as shown clearly in FIG. 5. With reference to FIG. 4, the gear teeth 15 are not as wide as the width of rack segment or element 20. This will prevent the rack segments 20 from fouling the points of the spacer 50 when the direction of motion is reversed and no load is being transmitted and when there is enough play between the segments to allow such fouling. In this case a pair of guide tongues 52 and 54 are arranged flush with the horizontal edge of the lower point of the elements to function as a portion of the lower guide. The guide tongues extend inwardly toward the axis of the gear to a point where it will intercept the support of the elements prior to their leaving contact with the gear teeth as shown in FIG. 4. This arrangement assists in preventing the rack segments from fouling the points of spacer 50 as the segments 201 are supported on the guides.

Figure 6:
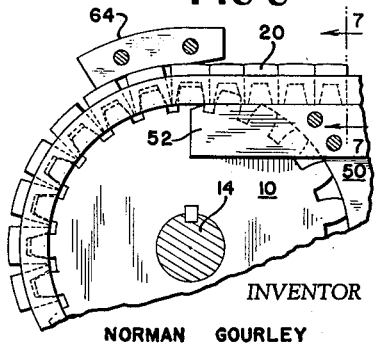
FIG. 6 is a side elevation view of a portion of the apparatus illustrating another modification utilizing elastic bands as a portion of the guiding and supporting means for adjacent power transmitting elements.
Figure 7:
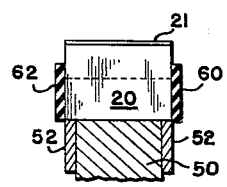
FIG. 7 is a sectional view taken along line 7—7 of FIG. 6.

FIGS. 6 and 7 illustrate a modification with all the segments 20 elastically connected together by means of elastic belts 60 and 62 bonded to each side of each segment. The segments are connected in such a way as to place the elastic belts 60 and 62 in tension in all of the guide system except over the short portion at the gear teeth. This eliminates the necessity of all guides except guide 64 and part of 50 and 52 around a portion of the periphery of gear 10 and the corresponding gear, not shown.

FIG. 8 shows a modification of the system to give an extensive variation of the center distance between a driven gear 10 and a drive gear 70. Drive gear 70 is mounted on a shaft 72 movable within a slot 74. An idler gear 12 similar to that shown in FIG. 1 is provided. The individual rack segments 20 and the remaining guiding and spacing system is similar to that described in connection with FIG. 5. The periphery of the driving gear 70 engages the individual rack segments 20 to transmit the power through these segments to the driven gear 10 while the rack segments are being recirculated around the peripheries of driven gear 10 and idler gear 12. It can be seen with this construction that the center distance between driven shaft 14 and driving gear shaft 72 can be varied by moving gear shaft 72 in slot 74. This provides excellent flexibility in the application of this device.

FIGS. 9 and 10 show a further modification of the device with teeth 94 in the side of the rack elements 20 in order to provide a separate drive or take-off by gears 96 and 98. With the FIG. 10 embodiment, gear 96, for example, could be the driving gear and gear 98 could be the driven gear and gears 10 and 12 would both be idler gears utilized only for recirculation of the drive elements.

Thus, applicant has disclosed a power transmission utilizing separate recirculated rack segments as the separate power transmitting elements, and by this unobvious construction has solved a number of long standing problems in the art. The advantages obtainable with the basic construction of this invention over the known prior art includes; more power transmitting capacity per unit size, less side forces on the guide system, smoother action with minimum vibration, more accuracy, ease in manufacture and greater adaptability to different operations. It will be apparent that the unique power transmitting apparatus of this invention could also be used as a cutting or abrading machine by merely putting cutting or abrading elements on the separate rack elements and, further, could be utilized as a switch actuator by arranging a switch adjacent to certain separate elements with actuators thereon.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:
1. In a power transmission system including spaced apart rotatable gear members having involute form gear teeth on their periphery, the members being mounted for rotation, and guide and support means for guiding and supporting separate power transmitting elements around the periphery of said members and from one member to another in abutting relationship, the improvement that comprises separate block-like power transmitting elements formed as a segment of a rack with flat parallel abutting sides and each having in one side thereof a tooth form cavity for meshing with the involute gear tooth form of the gear members, an involute tooth form being defined between the tooth form cavities of adjacent elements when they are in abutting relationship, said tooth form being adapted to mesh with the gear teeth so that power may be transmitted through said elements in abutting realtionship and said gear teeth from one rotary member to another.

2. A power transmission system as defined in claim 1 further comprising gear teeth cavities formed on both side faces of said power transmitting element and power transmitting gears mounted adjacent both sides of said power transmitting elements at the portion of said elements or moving in a straight line in abutting relationship.

3. A power transmission apparatus comprising; spaced apart rotatable gear members having gear teeth thereon, a plurality of separate disconnected block-like power transmitting elements formed as segments of a rack with flat parallel abutting edges, each element including at one other edge thereof at least a portion of a tooth and tooth form cavity for meshing with the gear teeth on the gear members, at least one tooth form and complementary tooth form cavity being defined by adjacent elements when they are in abutting relationship along their flat parallel edges, said teeth formed by abutting elements meshing with the gear teeth of the rotatable gear member so that power may be transmitted through said elements and the flat abutting faces thereof while in abutting relationship from the gear teeth of one rotary member to another, and guide and support means for guiding and supporting the separate disconnected block-like power transmitting elements from one gear member to another while in abutting relationship.

4. A power transmitting apparatus as defined in claim 3 wherein the teeth on the gear members and the tooth and tooth form cavity in each element are involute in form.

5. A power transmitting apparatus comprising in combination;

(a) spaced apart rotatable gear members having gear teeth thereon, (b) a plurality of individual separate block-like power transmitting elements formed as segments of a rack having opposed flat edge faces of substantial area positioned in abutting relationship for the transfer of power by compression of individual abutting elements positioned between and around the ends of the rotatable gear members, (c) each element including on one other edge thereof at least a portion of a tooth and tooth form cavity complementary to and meshing with the gear teeth of the gear members, at least one tooth form and complementary tooth form cavity being defined by adjacent elements when they are positioned in abutting relationship at the mating edge faces, (d) said teeth formed by said abutting elements meshing with both sides of the gear teeth of the rotatable gear members so that power may be transmitted through said elements and the mating abutting faces thereof in either direction without large backlash by compression of the elements positioned between the gear teeth of the spaced apart rotary gear members, (e) means for guiding and supporting the individual separate disconnected block-like power transmitting elements with opposed mating faces in abutting relationship from one gear member to another and around the outer periphery of the gear members.

References Cited in the file of this patent

UNITED STATES PATENTS

| | | |
|---|---|---|
| 354,854 | Crispin | Dec. 21, 1886 |
| 570,698 | Curtis | Nov. 3, 1896 |
| 612,780 | Mansione | Oct. 18, 1898 |
| 1,140,319 | Van Houten | May 18, 1915 |
| 1,983,962 | Barber et al. | Dec. 11, 1934 |
| 2,346,424 | Griffith | Apr. 11, 1944 |

FOREIGN PATENTS

| | | |
|---|---|---|
| 339,239 | Great Britain | Dec. 2, 1930 |
| 522,863 | Great Britain | June 28, 1940 |